US011379937B2

(12) United States Patent
Nakagaki et al.

(10) Patent No.: US 11,379,937 B2
(45) Date of Patent: Jul. 5, 2022

(54) POWER MANAGEMENT SERVER AND POWER MANAGEMENT METHOD

(71) Applicant: KYOCERA Corporation, Kyoto (JP)

(72) Inventors: Nodoka Nakagaki, Yokohama (JP); Kenta Okino, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 225 days.

(21) Appl. No.: 16/767,590

(22) PCT Filed: Nov. 28, 2018

(86) PCT No.: PCT/JP2018/043837
§ 371 (c)(1),
(2) Date: May 28, 2020

(87) PCT Pub. No.: WO2019/107435
PCT Pub. Date: Jun. 6, 2019

(65) Prior Publication Data
US 2020/0387982 A1 Dec. 10, 2020

(30) Foreign Application Priority Data

Nov. 29, 2017 (JP) .............................. JP2017-228874
Apr. 12, 2018 (JP) .............................. JP2018-077153

(51) Int. Cl.
*G06Q 50/06* (2012.01)
*H02J 13/00* (2006.01)
(Continued)

(52) U.S. Cl.
CPC .............. *G06Q 50/06* (2013.01); *H02J 3/32* (2013.01); *H02J 13/00* (2013.01); *H02J 3/14* (2013.01); *H02J 3/28* (2013.01)

(58) Field of Classification Search
CPC .... G06Q 50/06; H02J 3/32; H02J 3/14; H02J 3/28; H02J 3/381; H02J 13/00;
(Continued)

(56) References Cited

U.S. PATENT DOCUMENTS 10,033,214 B2    7/2018 Yano et al.
10,381,832 B2 *  8/2019 Sato ........................ H02J 3/466
(Continued)

FOREIGN PATENT DOCUMENTS

EP        3116081 A1 *  1/2017 ............... H02J 3/12
JP     2018-093719 A  *  6/2018 ............... G05F 1/66
(Continued)

OTHER PUBLICATIONS

Machine translation of JP 2019-068512 A (description section) (Year: 2019).*

*Primary Examiner* — M. N. Von Buhr
(74) *Attorney, Agent, or Firm* — Hauptman Ham, LLP

(57) ABSTRACT

A power management server comprises a controller configured to select based on a predetermined standard, from among a plurality of facilities including a distributed power supply, a first facility in which first processing is applied to the distributed power supply and a second facility in which second processing is applied to the distributed power supply. The first processing is processing of controlling an output power of the distributed power supply by using a first target value as a target value for purchased power purchased by the facility from a power provider. The second processing is processing of controlling the output power of the distributed power supply by using a second target value as the target value for the purchased power, the second target value being greater than the first target value.

11 Claims, 11 Drawing Sheets

(51) Int. Cl.
*H02J 3/32* (2006.01)
*H02J 3/28* (2006.01)
*H02J 3/14* (2006.01)

(58) Field of Classification Search
CPC .......... H02J 13/00004; H02J 13/00006; Y04S 10/12; Y04S 10/14; Y04S 40/12; Y02E 40/70; Y02E 60/00
See application file for complete search history.

(56) References Cited

U.S. PATENT DOCUMENTS

| | | | |
|---|---|---|---|
| 11,050,073 B2* | 6/2021 | Goto | H01M 8/04626 |
| 2011/0172837 A1* | 7/2011 | Forbes, Jr. | G05B 15/02 |
| | | | 700/291 |
| 2015/0207323 A1* | 7/2015 | Baba | H02J 7/35 |
| | | | 307/20 |
| 2016/0125339 A1* | 5/2016 | Itaya | G06Q 10/06315 |
| | | | 705/7.25 |
| 2017/0141587 A1* | 5/2017 | Kudo | H02J 13/00016 |
| 2017/0293975 A1* | 10/2017 | Saito | G06Q 50/06 |

FOREIGN PATENT DOCUMENTS

| | | | | |
|---|---|---|---|---|
| JP | 2019-068512 A | * | 4/2019 | .............. H02J 3/32 |
| JP | 2019-068513 A | * | 4/2019 | .............. H02J 13/00 |
| WO | 2015041010 A1 | | 3/2015 | |
| WO | 2016084396 A1 | | 6/2016 | |
| WO | WO 2017/195651 | * | 11/2017 | .............. H02J 13/00 |

* cited by examiner

FIG. 13

| TimeStamp | MARGIN | COUNT |
|---|---|---|
| 2018/7/1 10:00 | 0.15 | 25 |
| 2018/7/2 10:00 | 1 | 50 |
| 2018/7/3 10:00 | 0.87 | 50 |
| 2018/7/4 10:00 | 0.22 | 60 |
| 2018/7/5 10:00 | 0.46 | 63 |

US 11,379,937 B2

POWER MANAGEMENT SERVER AND POWER MANAGEMENT METHOD

RELATED APPLICATIONS

The present application is a National Phase of International Application No. PCT/JP2018/043837, filed Nov. 28, 2018, and claims priority based on Japanese Patent Application No. 2017-228874, filed Nov. 29, 2017 and Japanese Patent Application No. 2018-077153, filed Apr. 12, 2018.

TECHNICAL FIELD

The present invention relates to a power management server and a power management method.

BACKGROUND ART

In recent years, technologies for suppressing the amount of power flow to facilities from a power grid in order to maintain the demand power/supply balance of the power grid have been known. Technologies that utilize a storage battery apparatus provided in a facility in order to maintain the demand power/supply balance of a power grid have also been proposed (Patent Literature 1 and 2, for example).

CITATION LIST

Patent Literature

Patent Literature 1: International Patent Publication Pamphlet No. 2015/041010
Patent Literature 2: International Patent Publication Pamphlet No. 2016/084396

SUMMARY OF INVENTION

A power management server according to a first feature comprises a controller configured to select based on a predetermined standard, from among a plurality of facilities including a distributed power supply, a first facility in which first processing is applied to the distributed power supply and a second facility in which second processing is applied to the distributed power supply. The first processing is processing of controlling an output power of the distributed power supply by using a first target value as a target value for purchased power purchased by the facility from a power provider. The second processing is processing of controlling the output power of the distributed power supply by using a second target value as the target value for the purchased power, the second target value being greater than the first target value. The controller is configured to select a candidate of the first facility and the second facility until a secured power amount exceeds a margin threshold value which is obtained by adding a first margin to a contracted power amount. The contracted power amount is a power amount which is established to be reduced from a baseline power as all of the plurality of facilities. The secured power amount is a total power amount which can be reduced from the baseline power of facilities selected as the candidate of the first facility and the second facility. The controller is configured to configure the first margin based on an estimated demand power of the plurality of facilities.

A power management method according to a second feature comprises a step A of selecting, based on a predetermined standard, from among a plurality of facilities including a distributed power supply, a first facility in which first processing is applied to the distributed power supply and a second facility in which second processing is applied to the distributed power supply, and a step B of configuring a first margin which is added to a contracted power amount based on an estimated demand power of the plurality of facilities. The first processing is processing of controlling an output power of the distributed power supply by using a first target value as a target value for purchased power purchased by the facility from a power provider. The second processing is processing of controlling the output power of the distributed power supply by using a second target value as the target value for the purchased power, the second target value being greater than the first target value. The step A includes a step of selecting a candidate of the first facility and the second facility until a secured power amount exceeds a margin threshold value which is obtained by adding the first margin to the contracted power amount. The contracted power amount is a power amount which is established to be reduced from a baseline power as all of the plurality of facilities. The secured power amount is a total power amount which can be reduced from the baseline power of facilities selected as the candidate of the first facility and the second facility.

Advantageous Effects of Invention

According to an embodiment, a power management server and a power management method that enable the demand power/supply balance of a power grid to be suitably maintained by using a distributed power supply such as a storage battery apparatus can be provided.

BRIEF DESCRIPTION OF DRAWINGS

FIG. 13 is a diagram to illustrate a modification example 4.

DESCRIPTION OF EMBODIMENTS

An embodiment will be described hereinbelow with reference to the drawings. Note that, in the description of the drawings hereinbelow, the same or similar reference signs are assigned to the same or similar parts.

However, it should be noted that the drawings are schematics and that the proportions of each of the dimensions, and the like, sometimes differ from the real proportions and so forth. Therefore, specific dimensions and so forth should be determined by referring to the description hereinbelow. Furthermore, it is obvious that the drawings may also contain parts the dimensional relationships or proportions of which differ between drawings.

Summary of Embodiment

In recent years, in a case where a storage battery apparatus is used to maintain a demand power/supply balance of a power grid, consideration has been given to controlling the discharge power of the storage battery apparatus to follow the demand power of a facility ("load following processing" hereinbelow).

However, when load following processing is applied collectively to all facilities, suitably maintaining the demand power/supply balance of a power grid will likely be impossible in a facility in which the demand power exceeds the maximum discharge power of the storage battery apparatus.

In order to solve the foregoing problem, a power management server and a power management method that enable the demand power/supply balance of a power grid to be suitably maintained by using a distributed power supply such as a storage battery apparatus are provided in an embodiment.

Embodiment (Power Supply Management System)

A power supply management system according to an embodiment will be described hereinbelow.

Figure 1:
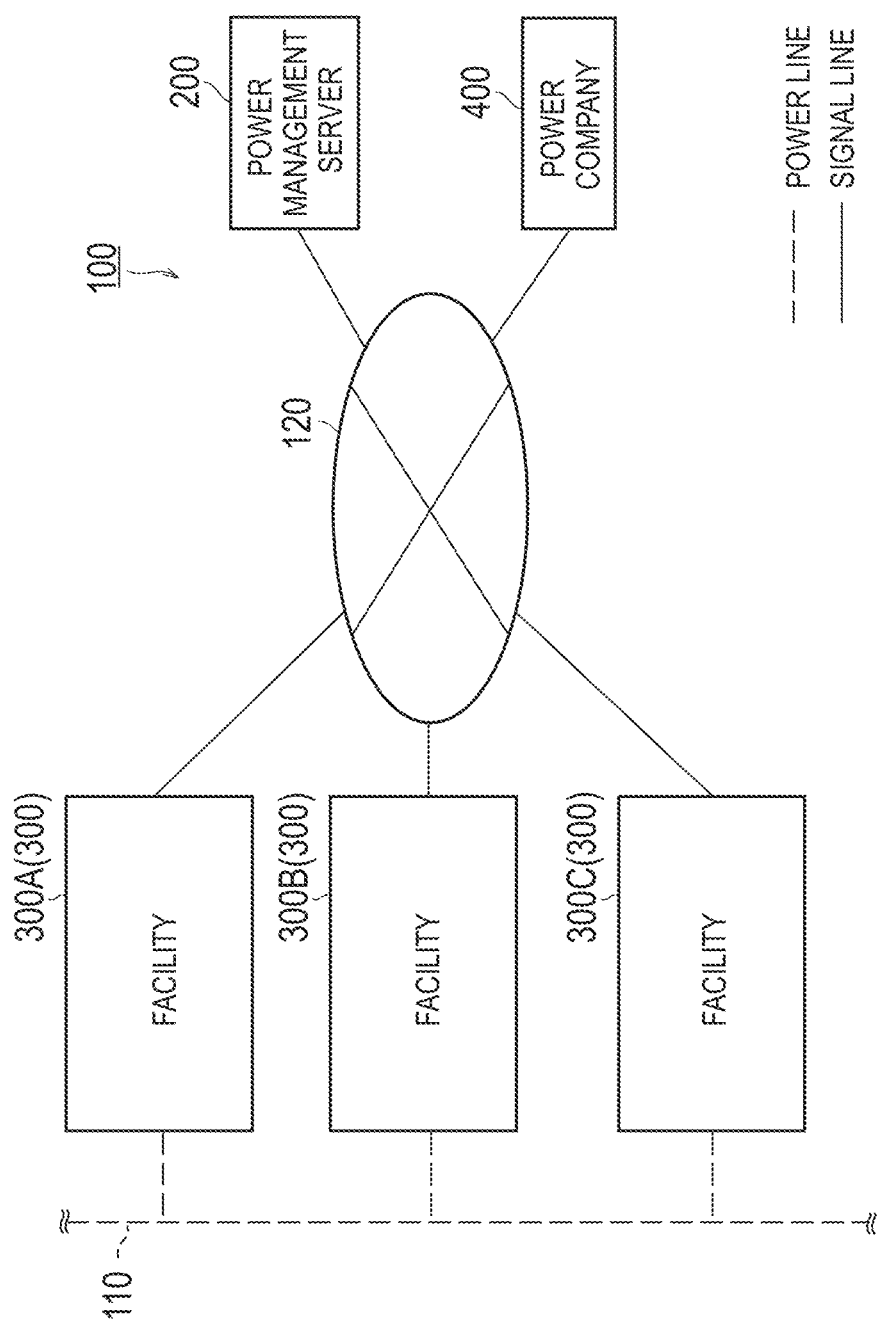
FIG. 1 is a diagram illustrating a power supply management system 100 according to an embodiment.

As illustrated in FIG. 1, a power supply management system 100 includes a power management server 200, facilities 300, and a power company 400. In FIG. 1, facilities 300A to 300C are illustrated as the facilities 300.

The facilities 300 are each connected to a power grid 110. Hereinbelow, the flow of electric power from the power grid 110 to the facilities 300 is called the power flow, and the flow of electric power from the facilities 300 to the power grid 110 is called the reverse power flow.

The power management server 200, the facilities 300, and the power company 400 are connected to a network 120. The network 120 may provide lines between the power management server 200 and the facilities 300 and a line between the power management server 200 and the power company 400. The network 120 is the internet, for example. The network 120 may provide a dedicated line such as a virtual private network (VPN).

The power management server 200 is a server that is managed by a power provider such as a power wholesaler, a power transmission and distribution company, a retailer, or a resource aggregator. A resource aggregator is a power provider that provides reverse power-flow power to power wholesalers, power transmission and distribution companies, and retailers, and so forth, in a virtual power plant (VPP). In the embodiment, the power management server 200 is an example of a reverse power-flow power purchasing entity. The power management server 200 is an example of a power supply management server.

The power management server 200 transmits, to a local control apparatus 360 provided in the facilities 300, a control message instructing control of a distributed power supply (a solar cell apparatus 310, a storage battery apparatus 320, or a fuel cell apparatus 330, for example) that is provided in the facilities 300. For example, the power management server 200 may transmit a power flow control message (a DR; Demand Response, for example) requesting control of power flow or may transmit a reverse power flow control message requesting control of reverse power flow. In addition, the power management server 200 may transmit a power supply control message that controls the operating state of the distributed power supply. The degree of control of the power flow or reverse power flow may be represented by an absolute value (in kilowatts, for example) or may be represented by a relative value (a percentage, for example). Alternatively, the degree of control of the power flow or the reverse power flow may be represented by two or more levels. The degree of control of the power flow or reverse power flow may be represented by power charges (RTP; Real Time Pricing) which are established according to the current demand power/supply balance or may be represented by the power charges (TOU; Time Of Use) established according to a historical demand power/supply balance.

Figure 2:
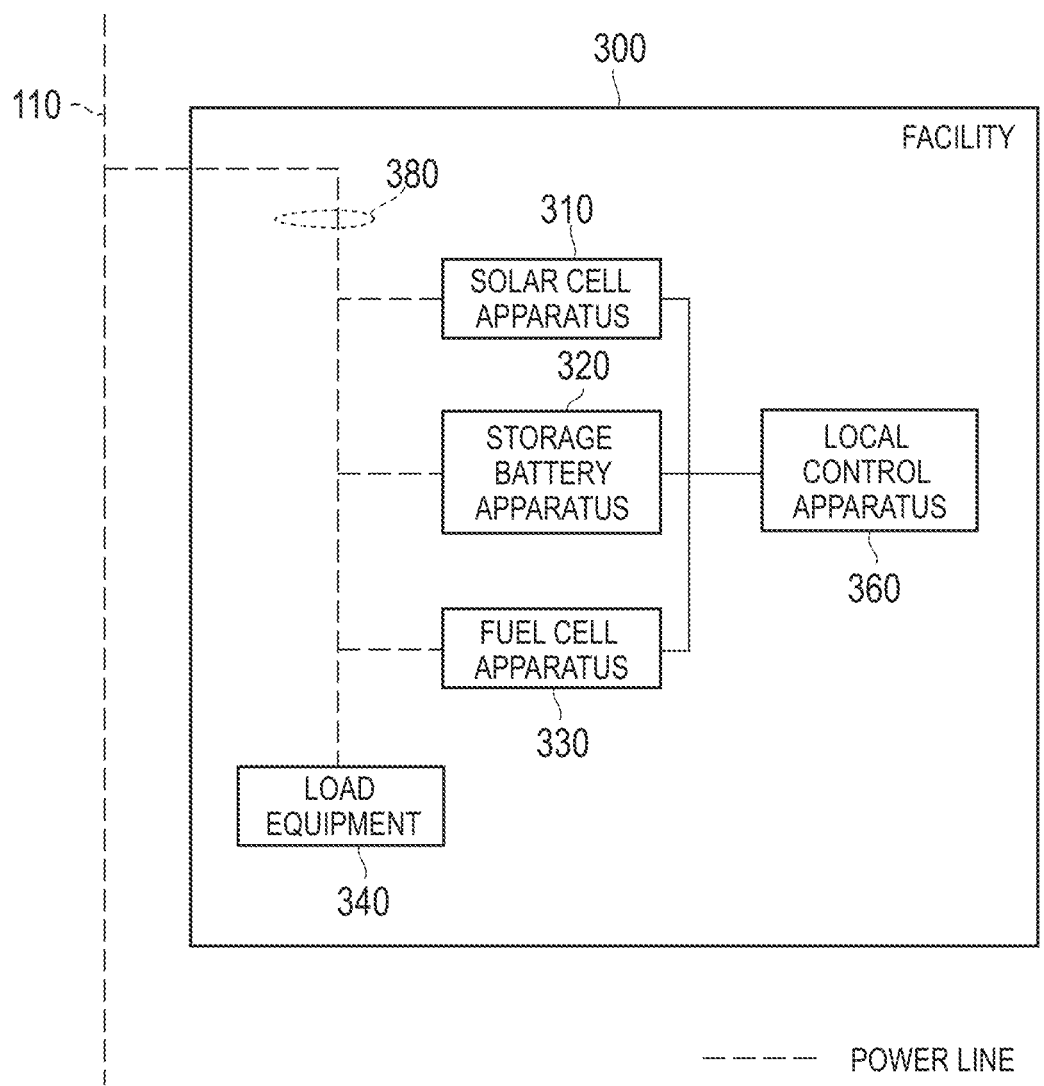
FIG. 2 is a diagram illustrating a facility 300 according to the embodiment.

As illustrated in FIG. 2, the facilities 300 include a solar cell apparatus 310, a storage battery apparatus 320, a fuel cell apparatus 330, a load equipment 340, a local control apparatus 360, and a power meter 380.

The solar cell apparatus 310 is a distributed power supply that generates power in response to light such as sunlight. The solar cell apparatus 310 is an example of a specified distributed power supply for which a predetermined purchase price is adopted. For example, the solar cell apparatus 310 is configured from a Power Conditioning System (PCS) and a solar panel.

The storage battery apparatus 320 is a distributed power supply that performs power charging and power discharging. The storage battery apparatus 320 is an example of a distributed power supply for which a predetermined purchase price is not adopted. For example, the storage battery apparatus 320 is configured from a PCS and a storage battery cell.

The fuel cell apparatus 330 is a distributed power supply that uses fuel to perform power generation. The fuel cell apparatus 330 is an example of a distributed power supply for which a predetermined purchase price is not adopted and is a distributed power supply having a rated operation mode that outputs rated power. For example, the fuel cell apparatus 330 is configured from a PCS and a fuel battery cell.

For example, the fuel cell apparatus 330 may be a solid oxide fuel cell (SOFC), may be a polymer electrolyte fuel cell (PEFC), may be a phosphoric acid fuel cell (PAFC), or may be a molten carbonate fuel cell (MCFC).

In the embodiment, the solar cell apparatus 310, the storage battery apparatus 320, and the fuel cell apparatus 330 may be a power supply used in a VPP.

The load equipment 340 is an equipment that consumes power. For example, the load equipment 340 is air-conditioning equipment, lighting equipment, or audio visual (AV) equipment, or the like.

The local control apparatus 360 is an apparatus (an EMS; Energy Management System) that manages the power of the facilities 300. The local control apparatus 360 may control the operating state of the solar cell apparatus 310, may control the operating state of the storage battery apparatus 320 provided in the facilities 300, or may control the operating state of the fuel cell apparatus 330 provided in the facilities 300. Details on the local control apparatus 360 will be provided subsequently (see FIG. 4).

In the embodiment, communication between the power management server 200 and the local control apparatus 360 is performed according to a first protocol. However, communication between the local control apparatus 360 and the distributed power supply (the solar cell apparatus 310, the storage battery apparatus 320, or the fuel cell apparatus 330) is performed according to a second protocol that is different from the first protocol. For example, as the first protocol, a protocol conforming to Open Automated Demand Response (ADR) or an independent, dedicated protocol may be used. For example, as the second protocol, a protocol conforming to ECHONET Lite, Smart Energy Profile (SEP) 2.0, KNX, or an independent, dedicated protocol may be used. Note that the first and second protocols may be different and may, for example, be protocols created using different rules despite both being independent, dedicated protocols.

The power meter 380 is an example of a first power meter that measures the amount of power flow from the power grid 110 to the facilities 300 and the amount of reverse flow from the facilities 300 to the power grid 110. For example, the power meter 380 is a smart meter that belongs to the power company 400.

Here, the power meter 380 transmits, in each unit time period (thirty minutes, for example), a message containing an information element indicating a measurement result (the amount (Wh) of power flow or reverse power flow) in the unit time period, to the local control apparatus 360. The power meter 380 may transmit the message autonomously or may transmit the message in response to a request from the local control apparatus 360.

The power company 400 is an entity providing infrastructure such as the power grid 110 and is, for example, a power provider such as a power wholesaler or a power transmission and distribution company. The power company 400 may entrust various tasks to an entity that manages the power management server 200.

(Power Management Server)

Figure 3:
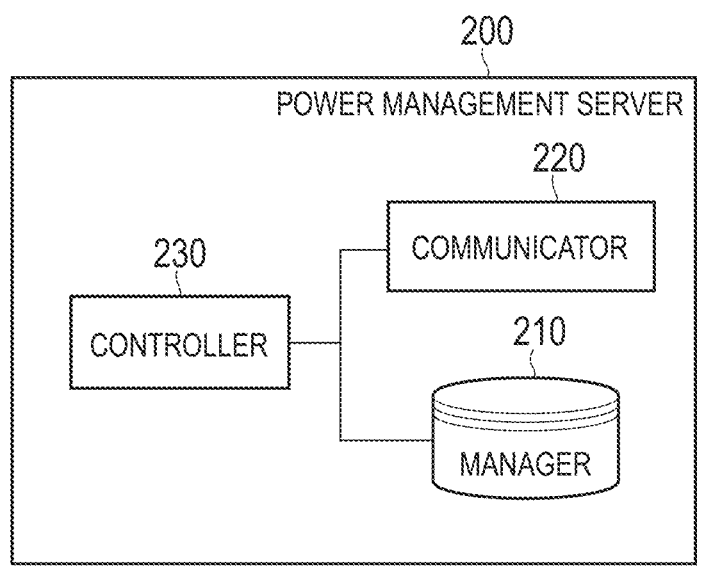
FIG. 3 is a diagram illustrating a power management server 200 according to the embodiment.

A power management server according to the embodiment will be described hereinbelow. As illustrated in FIG. 3, the power management server 200 includes a manager 210, a communicator 220, and a controller 230. The power management server 200 is an example of a Virtual Top Node (VTN).

The manager 210 is configured from a storage medium such as a nonvolatile memory and/or an HDD, or the like, and manages data relating to the facilities 300 managed by the power management server 200. The facilities 300 managed by the power management server 200 may be facilities 300 that have a contract with the entity managing the power management server 200. For example, the data relating to the facilities 300 may be the demand for power supplied to the facilities 300 from the power grid 110 or may be the amount of power which is reduced at each of the facilities 300 in response to a request to reduce the demand power (DR; Demand Response) of the whole power grid 110. The data relating to the facilities 300 may be the types of distributed power supply (the solar cell apparatus 310, the storage battery apparatus 320, or the fuel cell apparatus 330) provided in the facilities 300, the specifications of the distributed power supplies (the solar cell apparatus 310, the storage battery apparatus 320, or the fuel cell apparatus 330) provided in the facilities 300, and so forth. The specifications may be the rated power generation (W) of the solar cell apparatus 310, the maximum output power (W) of the storage battery apparatus 320, and the maximum output power (W) of the fuel cell apparatus 330. In addition, data relating to the facilities 300 may be the power output amount indicated for the distributed power supply in the past. For example, when a distributed power supply is the storage battery apparatus 320, the data relating to the facilities 300 may be the discharge power amount indicated for the storage battery apparatus 320. The data relating to the facilities 300 may be the degradation of the distributed power supply. For example, when the distributed power supply is the storage battery apparatus 320, the data relating to the facilities 300 may be the State of Health (SOH) of the storage battery apparatus 320.

The communicator 220 is configured from a communication module and performs communication with the local control apparatus 360 via the network 120. As mentioned hereinabove, the communicator 220 performs communication according to the first protocol. For example, the communicator 220 transmits a first message according to the first protocol to the local control apparatus 360. The communicator 220 receives a first message response from the local control apparatus 360 according to the first protocol.

In the embodiment, the communicator 220 receives, from the facilities 300 (the local control apparatus 360 or the power meter 380, for example), a message containing an information element indicating the demand for power supplied to the facilities 300 from the power grid 110. The demand power may be a value measured by the foregoing power meter 380. The demand power may be a value obtained by subtracting the output power of the distributed power supply (the solar cell apparatus 310, the storage battery apparatus 320, and the fuel cell apparatus 330) from the power consumption of the load equipment 340.

The controller 230 is configured from a memory and a CPU and the like and controls each configuration provided in the power management server 200. For example, by transmitting a control message, the controller 230 instructs the local control apparatus 360 provided in the facilities 300 to control the distributed power supply (the solar cell apparatus 310, the storage battery apparatus 320, or the fuel cell apparatus 330) that is provided in the facilities 300. As mentioned earlier, the control message may be a power flow control message, may be a reverse power flow control message, or may be a power supply control message.

(Local Control Apparatus)

Figure 4:
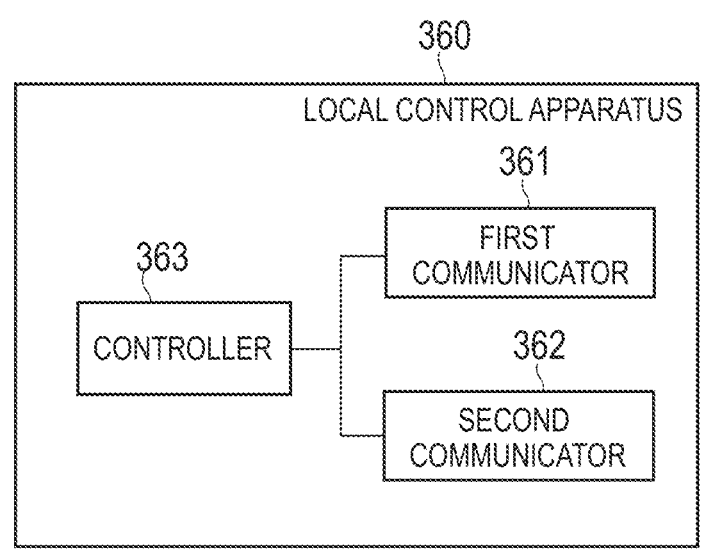
FIG. 4 is a diagram illustrating a local control apparatus 360 according to the embodiment.

The local control apparatus according to the embodiment will be described hereinbelow. As illustrated in FIG. 4, the local control apparatus 360 includes a first communicator 361, a second communicator 362, and a controller 363. The local control apparatus 360 is an example of a Virtual End Node (VEN).

The first communicator 361 is configured from a communication module and performs communication with the power management server 200 via the network 120. As mentioned hereinabove, the first communicator 361 performs communication according to the first protocol. For example, the first communicator 361 receives a first message from the power management server 200 according to the first protocol. The first communicator 361 transmits a first message response to the power management server 200 according to the first protocol.

The second communicator 362 is configured from a communication module and performs communication with the distributed power supply (the solar cell apparatus 310, the storage battery apparatus 320, or the fuel cell apparatus 330). As mentioned hereinabove, the second communicator 362 performs communication according to the second protocol. For example, the second communicator 362 transmits a second message to the distributed power supply according to the second protocol. The second communicator 362 receives a second message response from the distributed power supply according to the second protocol.

The controller 363 is configured from a memory and a CPU and the like and controls each of the configurations provided in the local control apparatus 360. More specifically, in order to control the power of the facilities 300, the controller 363 instructs an equipment to configure the operating state of the distributed power supply by means of the transmission of the second message and the reception of the second message response. In order to manage the power of the facilities 300, the controller 363 may instruct the distributed power supply to report distributed power supply information by means of the transmission of the second message and the reception of the second message response.

(Scene Application)

Scene application according to the embodiment will be described hereinbelow. A case where the power management server 200 receives a request to reduce the demand for power from the power grid 110 from the power company 400 which is a host node of the power management server 200 will be described. In such a case, the power management server 200 may reduce a power amount corresponding to a contracted power amount from the baseline power for all the facilities 300 managed by the power management server 200.

The contracted power amount may be a power amount established between the power management server 200 and the power company 400 in a negawatt transaction. The contracted power amount is a power amount that is established to be reduce from the baseline power for all of the plurality of facilities 300 managed by the power management server 200. The baseline power is the demand power assumed when a reduction request has not been made. The baseline power may be an average value of the demand power in a fixed period before advance notice of a reduction request. The fixed period may be established according to the substance of a negawatt transaction or may be established between the power management server 200 and the power company 400.

Against this background, the power management server 200 includes a controller 230 that selects, from among the plurality of facilities 300 having a distributed power supply (the storage battery apparatus 320 here), a first facility in which first processing is applied to the storage battery apparatus 320 and a second facility in which second processing is applied to the storage battery apparatus 320, on the basis of a predetermined standard. The controller 230 may select the foregoing first facility and second facility by using a demand response period during which there is a shortage of power from the power grid 110 as a target.

The first processing is processing for controlling the output power of the storage battery apparatus 320 by using a first target value as a target value for purchased power purchased by the facility 300 from a power provider. The foregoing first target value may be zero. Here, zero may be substantially zero, and a first target value of several tens of watts (W) may be configured in order to suppress a reverse power flow that accompanies a sudden fluctuation in the power consumption of the load equipment 340. In other words, zero may also be considered as a concept that includes several tens of watts (W). In such cases, the output power of the storage battery apparatus 320 follows the power consumption of the load equipment 340, and therefore the first processing may be called load following processing. The first processing may be processing which the storage battery apparatus 320 executes autonomously. In such cases, the power management server 200 may configure a first target value for the storage battery apparatus 320 and may instruct a period for executing the first processing.

The second processing is processing for controlling the output power of the storage battery apparatus 320 by using a second target value which is greater than the first target value as the target value for the purchased power. The second processing may be feedback processing (or sequential processing) that controls the storage battery apparatus 320 on the basis of the difference between the second target value and the purchased power. In the feedback processing, adjustment processing, which, during an Nth unit time period, compensates for a shortage error or excess error in the reduced power in an N−Xth unit time period, is performed. N and X are natural numbers and satisfy the relationship N>X. In such cases, the second processing may be processing for remotely controlling the storage battery apparatus 320 by means of the controller 230 (the power management server 200).

The controller 230 may configure the first target value and the second target value on the basis of at least one of the reduced power relative to the baseline power in each facility 300 and/or a reduction ratio relative to the baseline power in each facility 300 and an absolute value of the purchased power. When the first target value and the second target value are established on the basis of the reduced power relative to the baseline power, the difference between the baseline power and the reduced power corresponds to the purchased power. Therefore, even in this case, the first target value and second target value signify target values for the purchased power. Similarly, when the first target value and second target value are established on the basis of a reduction ratio relative to the baseline power, a value obtained by multiplying the baseline power by a value obtained by subtracting the reduction ratio from 1 corresponds to the purchased power. Therefore, even in this case, the first target value and second target value signify target values for the purchased power.

Furthermore, the foregoing predetermined standard is established to minimize an excess error and a shortage error in the reduced power of all the power supplied to the plurality of facilities 300 from the power grid 110. For example, the predetermined standard is a standard based on at least one of an absolute amount of the demand power of the facilities 300, a fluctuation amount of the demand power of the facilities 300, degradation degree of the storage battery apparatus 320, the costs of the output power of the storage battery apparatus 320, the type of the storage battery apparatus 320, and the type of equipment provided in the facilities 300 (the load equipment 340, for example).

(1) Absolute Amount of Demand Power of Facilities 300

When the absolute amount of the demand power of the facilities 300 is large, a state where the demand power of the facilities 300 exceeds the maximum output power of the storage battery apparatus 320 (that is, a state where the reduced power in a negawatt transaction is insufficient) is likely to arise. Therefore, in order to preferentially suppress a state where a reduced power is insufficient, the predetermined standard may be a standard according to which facilities 300 for which the absolute amount of the demand power is equal to or below a predetermined threshold value are selected as first facilities and facilities 300 for which the absolute amount of the demand power exceeds a predetermined threshold value are selected as the second facilities. The predetermined standard may also be a standard according to which facilities 300 for which the absolute amount of the demand power is relatively large are preferentially selected as the second facility.

(2) Fluctuation Amount of Demand Power of Facilities 300

When the fluctuation amount of the demand power of the facilities 300 is large, either a state where the demand power of the facilities 300 exceeds the maximum output power of the storage battery apparatus 320 (that is, a state where the reduced power in a negawatt transaction is insufficient) or a state where the purchased power is less than a target value (that is, a state where the reduced power in a negawatt transaction is excessive) is also likely to arise. Thus, the predetermined standard may be a standard according to which facilities 300 for which the fluctuation amount of demand power exceeds a predetermined threshold value are not selected as first facilities or second facilities. In addition, to prevent at least a state where reduced power is excessive, the predetermined standard may also be a standard according to which facilities 300 for which the fluctuation amount of the demand power exceeds a predetermined threshold value are selected as first facilities and facilities 300 for which the fluctuation amount of the demand power is equal to or below the predetermined threshold value are selected as the second facilities. The predetermined standard may also be a standard according to which facilities 300 for which the fluctuation amount of the demand power is relatively small are preferentially selected as the second facility.

(3) Degradation Degree of Storage Battery Apparatus 320

In order to equalize the degradation degree of the storage battery apparatus 320, the predetermined standard may be a standard according to which facilities 300 for which the degradation degree of the storage battery apparatus 320 is above a predetermined threshold value are not selected as first facilities or second facilities. In addition, when there is a possibility that the foregoing second processing will place a greater burden on the storage battery apparatus 320 than the first processing, the predetermined standard may be a standard according to which facilities 300 for which the degradation degree of the storage battery apparatus 320 is above a predetermined threshold value are selected as first facilities and facilities 300 for which the degradation degree of the storage battery apparatus 320 is equal to or below the predetermined threshold value are selected as second facilities. The predetermined standard may also be a standard according to which facilities 300 that include a storage battery apparatus 320 with relatively minimal degradation degree are preferentially selected as the second facility.

(4) Cost of Output Power of Storage Battery Apparatus 320

In order to effectively use the output power of the low-cost storage battery apparatus 320, the predetermined standard may be a standard according to which facilities 300 that have a storage battery apparatus 320 for which the output power cost is above a predetermined threshold value are not selected as first facilities or second facilities. In addition, because there is a possibility that the output power of the storage battery apparatus 320 will be suppressed more by the foregoing second processing than by the first processing, the predetermined standard may be a standard according to which facilities 300 that have a storage battery apparatus 320 for which the output power cost is equal to or below a predetermined threshold value are selected as first facilities and facilities 300 that have a storage battery apparatus 320 for which the output power cost is above the predetermined threshold value are selected as second facilities. The predetermined standard may also be a standard according to which facilities 300 that have a storage battery apparatus 320 with a relatively high output power cost are preferentially selected as second facilities.

Here, the output power cost of the storage battery apparatus 320 may be the cost required to store power in the storage battery apparatus 320. In other words, the output power cost of the storage battery apparatus 320 may be considered to be the cost of the power stored in the storage battery apparatus 320. Hence, in a case where the power of the power grid 110 is stored in the storage battery apparatus 320, the output power cost of the storage battery apparatus 320 may be established on the basis of an electricity tariff plan for which the facility 300 has a contract for power supplied from the power grid 110, or in a case where the output power of the solar cell apparatus 310 or the fuel cell apparatus 330 is stored in the storage battery apparatus 320, the output power cost of the storage battery apparatus 320 may be established on the basis of the power generation cost of the solar cell apparatus 310 or the fuel cell apparatus 330. In such a case, the charging efficiency and discharging efficiency of the storage battery apparatus 320 may also be considered.

(5) Type of Storage Battery Apparatus 320

For example, the type of the storage battery apparatus 320 is a parameter indicating a characteristic such as the maximum output power of the storage battery apparatus 320 or the load following capability of the storage battery apparatus 320. For example, this parameter may be a parameter indicating the output power responsiveness of the storage battery apparatus 320 to a fluctuation in the power consumption of the load equipment 340. This parameter may also be a parameter indicating a transmission delay between the power management server 200 and the facility 300 (the storage battery apparatus 320) in sequential processing.

For example, the predetermined standard may be a standard according to which facilities 300 having a storage battery apparatus 320 for which the maximum output power is greater than a predetermined threshold value are selected as first facilities and facilities 300 having a storage battery apparatus 320 for which the maximum output power is less than the predetermined threshold value are selected as second facilities. Alternatively, the predetermined standard may be a standard according to which facilities 300 having a storage battery apparatus 320 for which the load following capability is not more favorable than a predetermined threshold value are selected as first facilities and facilities 300 having a storage battery apparatus 320 for which the load following capability is more favorable than the predetermined threshold value are selected as second facilities.

(6) The Type of Equipment Provided in the Facilities 300 (the Load Equipment 340, for Example)

The type of equipment affects the absolute amount of the demand power of the facilities 300 and the fluctuation amount of the demand power of the facilities 300. Thus, the predetermined standard may be established on the basis of the equipment type using a similar approach to the absolute amount of the demand power of the facilities 300 and the fluctuation amount of the demand power of the facilities 300.

Here, processing for selecting the first facilities and the second facilities may be executed on the basis of two or more parameters selected from among (1) to (6) hereinabove. Standards based on two or more parameters may be combined using weightings.

(First Processing)

First processing according to the embodiment will be described hereinbelow. As mentioned earlier, the first processing is processing for controlling the output power of the storage battery apparatus 320 by using a first target value as a target value for purchased power purchased by the facility 300 from a power provider. Here, to simplify the description, the storage battery apparatus 320 does not perform discharging before the demand response period, and the storage battery apparatus 320 includes a residual storage amount that is required to perform discharging in the demand response period.

Figure 5:
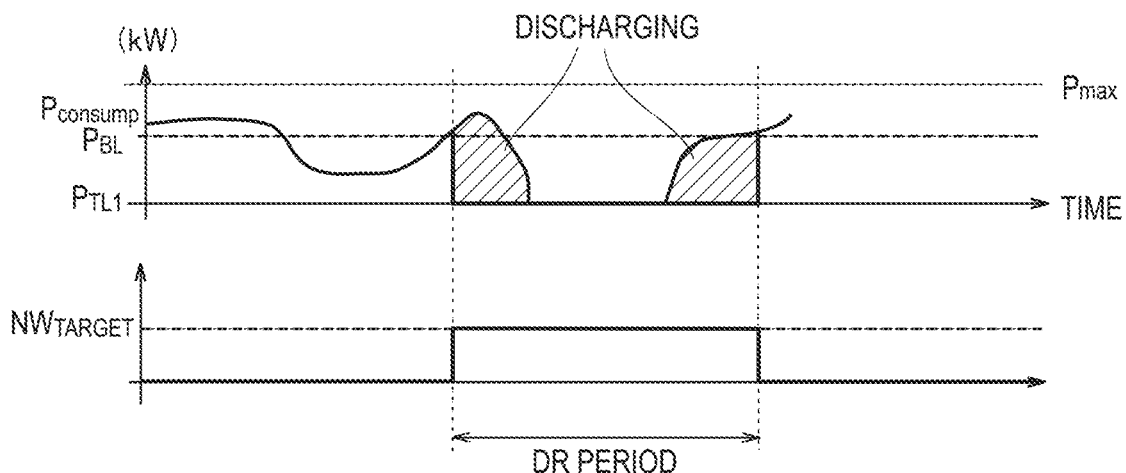
FIG. 5 is a diagram to illustrate first processing according to the embodiment.

For example, as illustrated in FIG. 5, the first target value (PTO is zero, and in the demand response period, the output power of the storage battery apparatus 320 follows the demand power ($P_{CONSUMP}$) at each facility 300. Hence, the target value ($NW_{TARGET}$) of the reduced power in a negawatt transaction is the same as the baseline power ($P_{BL}$) at each facility 300. The actual reduced power in a negawatt transaction reaches the target value ($NW_{TARGET}$) due to the discharging of the storage battery apparatus 320.

Figure 6:
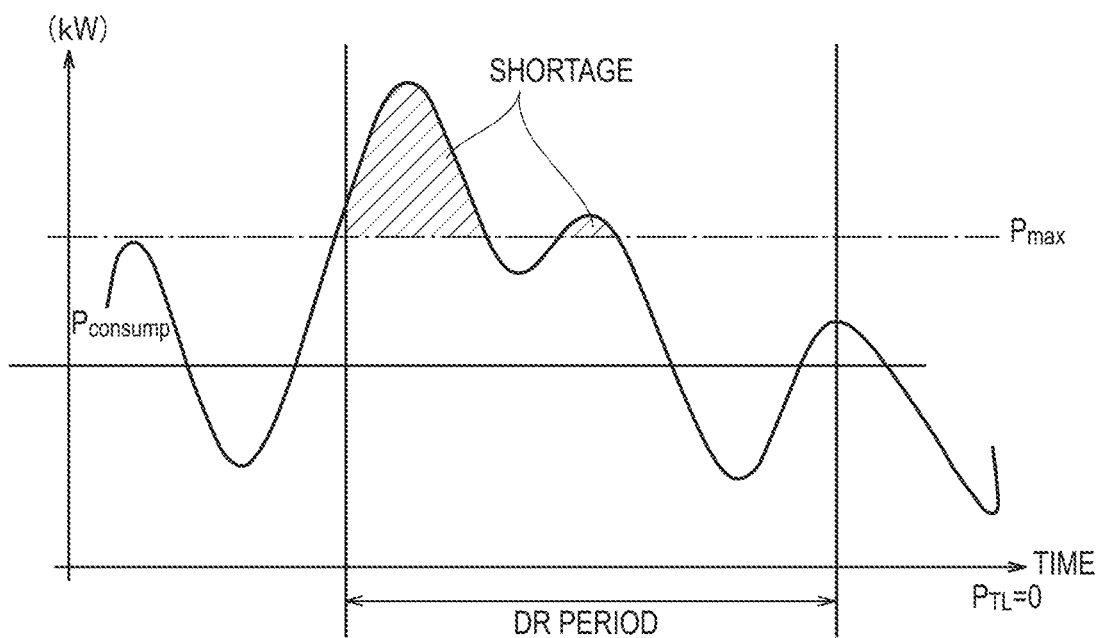
FIG. 6 is a diagram to illustrate first processing according to the embodiment.

However, as illustrated in FIG. 6, when the demand power ($P_{CONSUMP}$) exceeds the maximum output power ($P_{max}$) of the storage battery apparatus 320, a shortage in the reduced power in a negawatt transaction occurs. That is, for the first processing, in which the first target value, which is smaller than the second target value, is used as the target value for the purchased power, the likelihood of a reduced power shortage occurring is higher than for the second processing.

(Second Processing)

Second processing according to the embodiment will be described hereinbelow. As mentioned earlier, the second processing is processing for controlling the output power of the storage battery apparatus 320 by using a second target value which is greater than the first target value as the target value for the purchased power. Here, to simplify the description, the storage battery apparatus 320 does not perform discharging before the demand response period, and the storage battery apparatus 320 includes a residual storage amount that is required to perform discharging in the demand response period.

Figure 7:
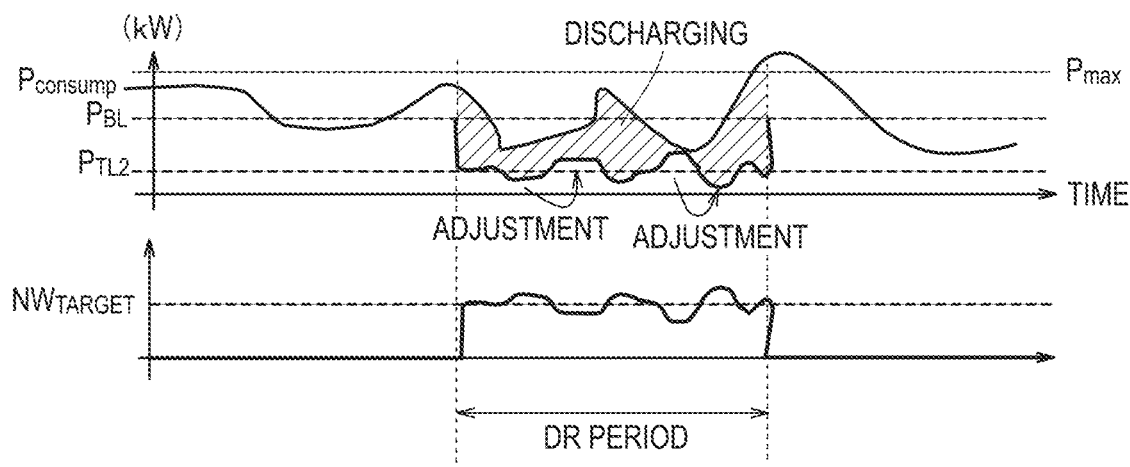
FIG. 7 is a diagram to illustrate second processing according to the embodiment.

For example, as illustrated in FIG. 7, the second target value ($P_{TL2}$) is a value greater than zero and, in the demand response period, the output power of the storage battery apparatus 320 follows a value obtained by subtracting the second target value ($P_{TL}$) from the demand power ($P_{CONSUMP}$) at each facility 300. Hence, the target value ($NW_{TARGET}$) for the reduced power in a negawatt transaction is the same as a value obtained by subtracting the second target value ($P_{TL}$) from the baseline power ($P_{BL}$) at each facility 300. The reduced power in a negawatt transaction reaches the target value ($NW_{TARGET}$) due to the discharging of the storage battery apparatus 320.

Figure 8:
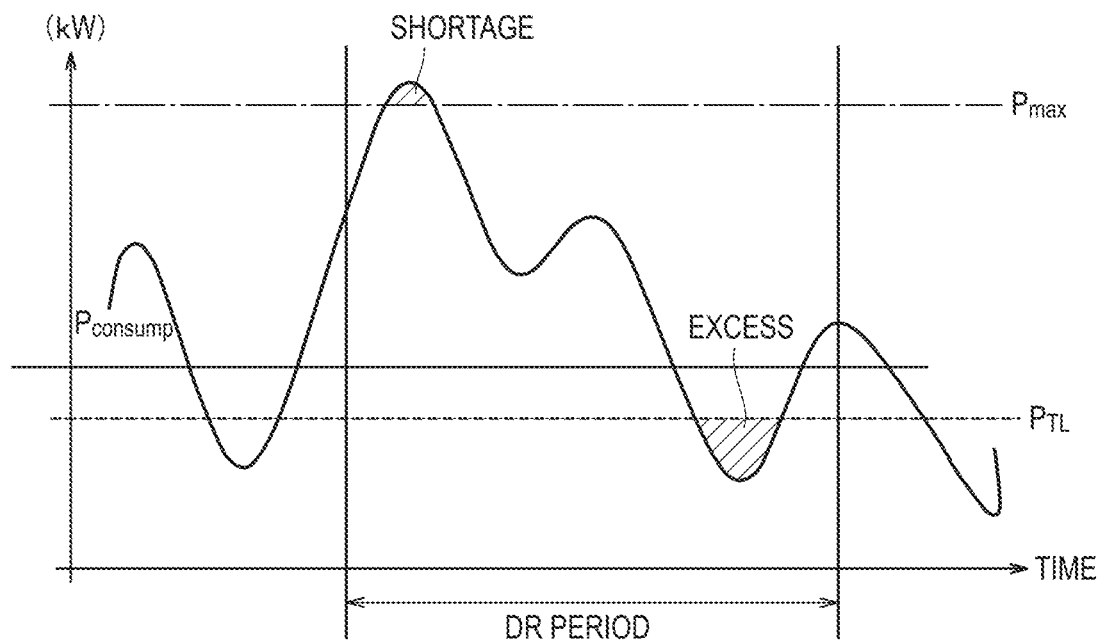
FIG. 8 is a diagram to illustrate second processing according to the embodiment.

However, as illustrated in FIG. 8, when the demand power ($P_{CONSUMP}$) exceeds the maximum output power ($P_{max}$) of the storage battery apparatus 320, there is a possibility of a shortage in the reduced power in a negawatt transaction occurring, and when the demand power ($P_{CONSUMP}$) is less than the second target value ($P_{TL}$), there is also a possibility of a reduced power excess in a negawatt transaction occurring. That is, although, for the second processing, in which the second target value, which is greater than the first target value, is used as the target value for the purchased power, the likelihood of a reduced power shortage occurring is lower than for the second processing, there is then a possibility of a reduced power excess occurring.

Hence, adjustment processing, which, during an Nth unit time period, compensates for a shortage error or an excess error in the reduced power in an N−Xth unit time period, is preferably performed by adopting feedback processing in the second processing. Such feedback processing enables a shortage or excess in the reduced power to be absorbed during the whole demand response period.

(Power Management Method)

The power management method according to the embodiment will be described hereinbelow.

Figure 9:
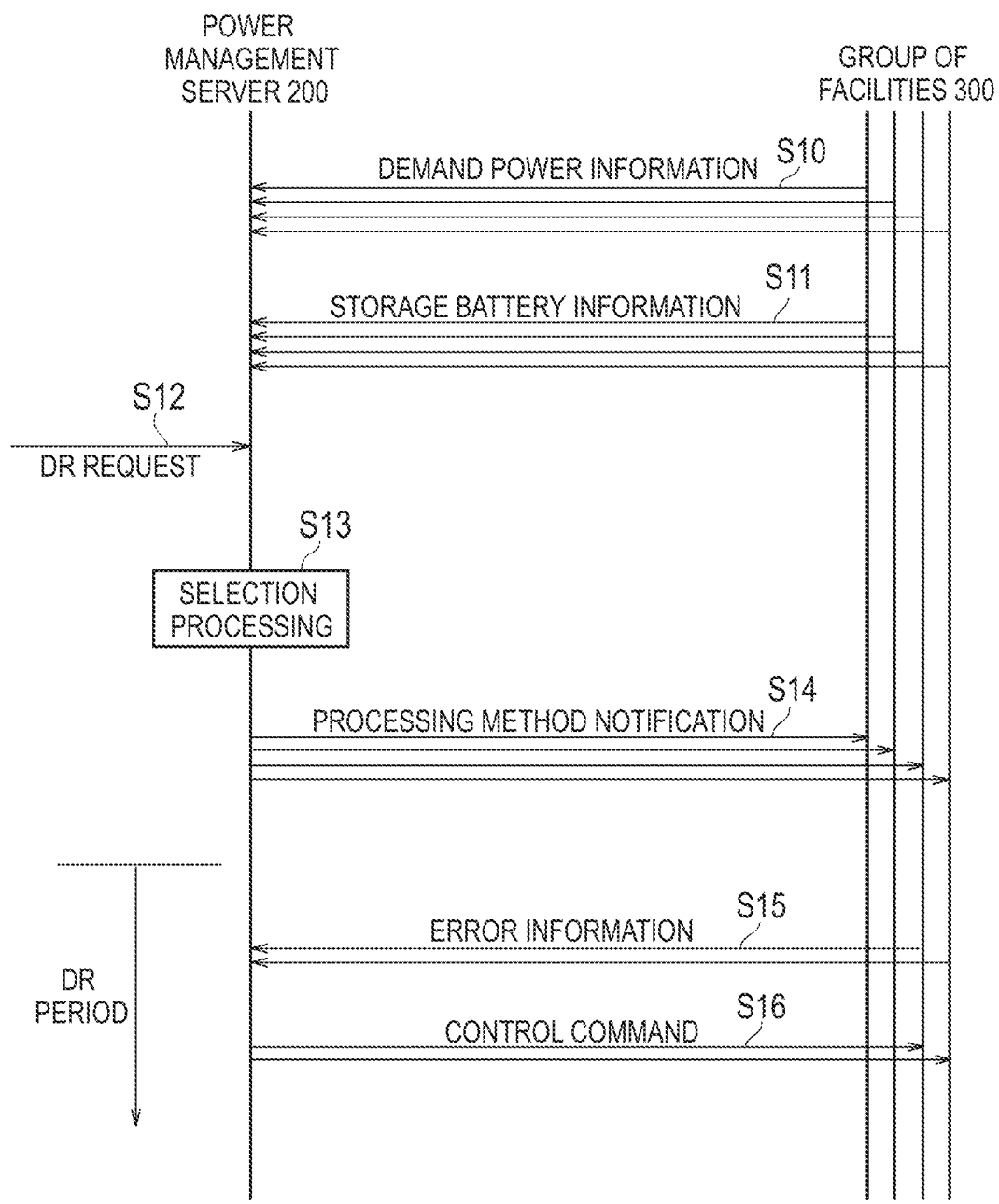
FIG. 9 is a diagram illustrating a power management method according to the embodiment.

As illustrated in FIG. 9, in step S10, the power management server 200 receives a message containing an information element indicating the demand power at each facility 300 (demand power information). For example, the processing of step S10 is carried out in each unit time period (thirty minutes, for example). Such a configuration also enables the power management server 200 to ascertain the demand power at each facility 300 and to ascertain the baseline power at each facility 300.

In step S11, the power management server 200 receives a message containing an information element relating to the storage battery apparatus 320 at each facility 300 (storage battery information). For example, the processing of step S10 is carried out in each unit time period. The unit time period of step S11 may also differ from the unit time period of step S10. For example, the storage battery information is information indicating the residual storage amount of the storage battery apparatus 320.

In step S12, the power management server 200 receives a reduction request from the power company 400.

In step S13, by using the demand response period as a target, the power management server 200 selects, on the basis of the predetermined standard, first facilities in which the first processing is applied to the storage battery apparatus 320 and second facilities in which the second processing is applied to the storage battery apparatus 320. Here, the plurality of facilities 300 managed by the power management server 200 may also include facilities 300 which are not selected as first facilities or second facilities. In other words, all facilities 300 need not participate in a reduction request. Note that an example of a selection method based on the predetermined standard will be described subsequently (see FIG. 10).

In step S14, the power management server 200 transmits, to each facility 300, a message containing an information element indicating the first processing or the second processing (a processing method notification).

In step S15, the facility 300 selected as the second facility transmits, to the power management server 200, a message containing an information element indicating a error between the purchased power and the second target value (error information). Here, the processing of step S15 is an operation after the demand response period has started.

In step S16, the power management server 200 transmits, to the facility 300 selected as the second facility, a control command for adjusting the error on the basis of the error information received in step S15.

In the case illustrated in FIG. 9, step S15 and step S16 are repeated in each unit time period (feedback processing). The unit time period of the feedback processing may be shorter than the unit time period for receiving the demand power information or the storage battery information.

Next, an example of the foregoing step S13 will be described. Here, a case where the predetermined standard is a standard based on the absolute amount of the demand power (hereinafter simply demand power) is illustrated. The demand power may be the demand power at the time of selecting the first facilities and the second facilities or may be the demand power in the past (the baseline power, for example).

Figure 10:
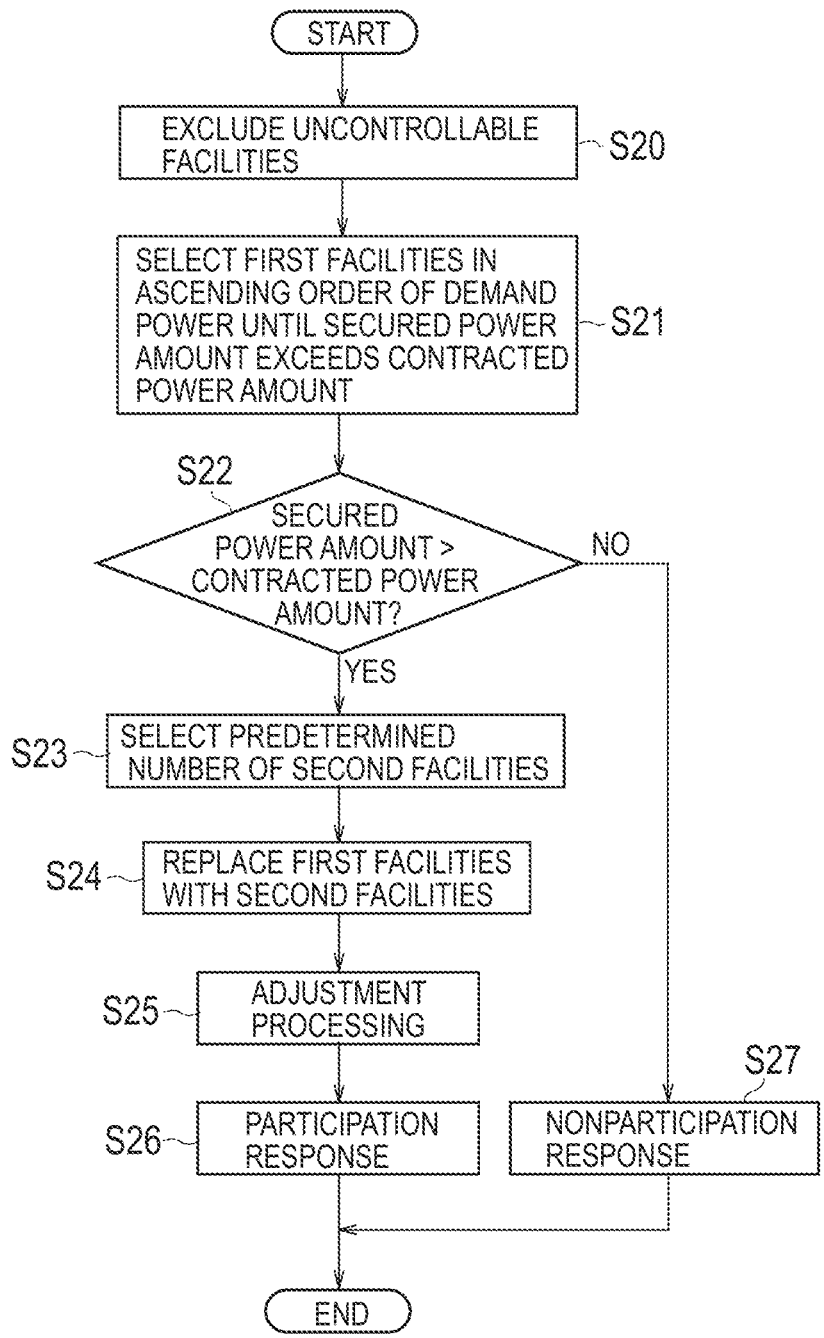
FIG. 10 is a diagram illustrating the power management method according to the embodiment.

As illustrated in FIG. 10, in step S20, the power management server 200 excludes the facilities 300 to which reduction request-related control cannot be applied from among the facilities 300 managed by the power management server 200. Such facilities 300 include, for example, facilities 300 not including the storage battery apparatus 320, facilities 300 having a storage battery apparatus 320 with an insufficient residual storage amount, and facilities 300 for which a communication channel to the power management server 200 cannot be secured, and the like.

In step S21, the power management server 200 selects, as first facilities, the facilities 300 in ascending order of demand power until the secured power amount exceeds the contracted power amount. The secured power amount is the total of the power amounts that can be reduced from the baseline power (demand power) for the facilities 300 selected as first facilities. Here, the total of the reducible power amounts is a total of a value obtained by subtracting the first target value ($P_{TL}$). Hence, when the first target value ($P_{TL}$) is zero, the secured power amount is the same as the total of the baseline power (demand power) of the facilities 300 selected as first facilities.

In step S22, the power management server 200 determines whether or not it has been possible to select first facilities until the secured power amount exceeds the contracted power amount. When the determination result is YES, the power management server 200 performs the processing of step S23. When the determination result is NO, the power management server 200 performs the processing of step S27.

In step S23, the power management server 200 selects, as second facilities, a predetermined number of facilities 300 from among the facilities 300 for which the demand power is greater than a predetermined threshold value. In such a case, the power management server 200 may select, as second facilities, a predetermined number of facilities 300 in ascending order of demand power from among the facilities 300 for which the demand power is greater than the predetermined threshold value.

In step S24, the power management server 200 replaces the facilities 300 selected as first facilities in step S21 with the facilities 300 selected as second facilities in step S23. After this replacement has been performed, the facilities 300 selected as first facilities in step S21 may be called a candidate of the first facility and the second facility. This replacement is performed so that the reduced power of the facilities 300 selected as second facilities is about the same as the reduced power of the facilities 300 selected as first facilities. The first facilities which are replacement targets may also be selected in descending order of demand power. In addition, when the reductions in power of the facilities 300 selected as first facilities and second facilities, respectively, do not completely match each other, the replacement may also be performed so that the reduced power of the facilities 300 selected as second facilities is greater than the reduced power of the facilities 300 selected as first facilities.

In step S25, the power management server 200 adjusts any error involved in the replacement of the first facilities with the second facilities. When the reduced power of the facilities 300 selected as second facilities is greater than the reduced power of the facilities 300 selected as first facilities, the removal of the facilities 300 with a large demand power from among the facilities 300 selected as first facilities is prioritized.

In step S26, the power management server 200 transmits a participation response to the reduction request to the power company 400.

In step S27, the power management server 200 transmits a non-participation response to the reduction request to the power company 400.

The processing illustrated in FIG. 10 may be performed by using the demand response period as a target. Hence, the processing illustrated in FIG. 10 may be performed not only before the demand response period but also during the demand response period. The processing illustrated in FIG. 10 may be performed in predetermined cycles.

(Action and Effect)

In the embodiment, the power management server 200 selects, on the basis of the predetermined standard, first facilities in which the first processing is applied to the storage battery apparatus 320 and second facilities in which the second processing is applied to the storage battery apparatus 320. This configuration enables the possibility of a shortage error or an excess error in the reduced power occurring to be reduced while maintaining the demand power/supply balance of the power grid 110.

Modification Example 1

A modification example 1 of the embodiment will be described hereinbelow. Differences from the embodiment will primarily be described hereinbelow.

In the embodiment, the power management server 200 selects, as first facilities (that is, as a candidate of the first facility and the second facility), the facilities 300 in ascending order of demand power until the secured power amount exceeds the contracted power amount. However, in a modification example 1, the power management server 200 selects, as first facilities (that is, as a candidate of the first facility and the second facility), the facilities 300 until the secured power amount exceeds a margin threshold value obtained by adding a first margin to the contracted power amount. As per the embodiment, the facilities 300 may be selected as first facilities in ascending order of demand power.

Here, the power management server 200 (the controller 230) configures the first margin on the basis of an estimated demand power of the plurality of facilities 300. The first margin may have either a positive value or a negative value. The first margin may be represented by a power amount that is added to the contracted power amount or may be represented by a percentage by which the contracted power amount is multiplied.

For example, when a time period (a shortage time period hereinbelow) in which the estimated demand power is greater than the previous demand power is included in the demand response period for all of the plurality of facilities 300, because there is then a possibility of a reduced power shortage occurring, a positive value may be configured as the first margin. That is, a larger number of facilities 300 than in the embodiment are selected as first facilities. On the other hand, when the shortage time period is not included in the demand response period for all of the plurality of facilities 300, because there is then a possibility of a reduced power excess occurring, a negative value may be configured as the first margin. That is, fewer facilities 300 than in the embodiment are selected as first facilities.

(Power Management Method)

A power management method according to the modification example 1 will be described hereinbelow. A method for determining the first margin will be described here.

Figure 11:
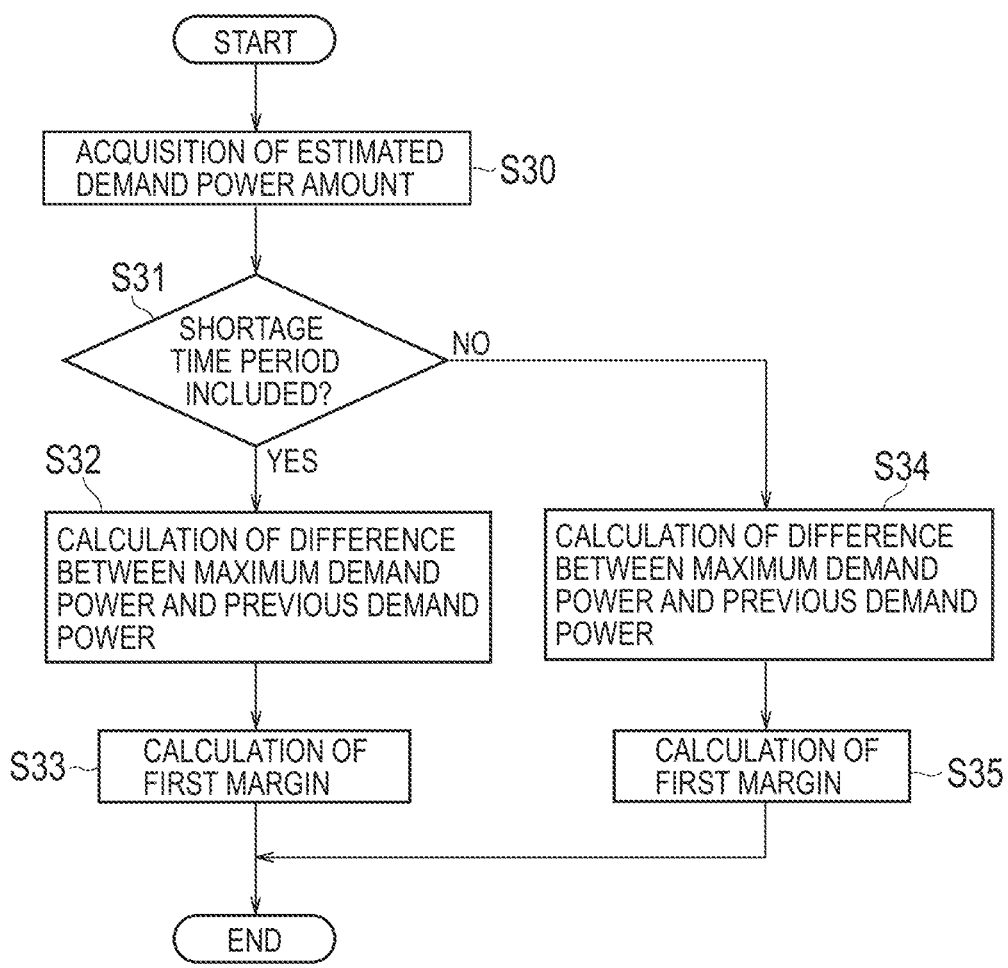
FIG. 11 is a diagram to illustrate a modification example 1.

As illustrated in FIG. 11, in step S30, the power management server 200 acquires the estimated demand power of the plurality of facilities 300. The estimated demand power is an estimated transition in the demand power in the demand response period. The estimated demand power may be estimated on the basis of a historical demand power transition. For example, the historical demand power is the demand power measured using the same conditions (the time period, day of the week, month, for example) as the demand response period.

In step S31, the power management server 200 determines whether or not a shortage time period is included in the demand response period. When the determination result is YES, the power management server 200 performs the processing of step S32. When the determination result is NO, the power management server 200 performs the processing of step S34.

In step S32, by using all of the plurality of facilities 300 as targets, the power management server 200 calculates the difference between a maximum value for the estimated demand power in the demand response period (the maximum demand power>the previous demand power, hereinbelow) and the previous demand power.

In step S33, the power management server 200 configures the first margin on the basis of the difference calculated in step S32. Here, the first margin is a positive value. For example, when the first margin is represented by a percentage by which the contracted power amount is multiplied, the first margin is given by the difference/the contracted power amount. Therefore, the margin threshold value is calculated by the contracted power amount×(1+the first margin). Thus, a larger number of facilities 300 than in the embodiment are selected as first facilities.

Here, the first margin may be a value obtained by subtracting the previous demand power from the maximum demand power or may be a value obtained by multiplying the value obtained by subtracting the previous demand power from the maximum demand power by a coefficient. The first margin may also be represented by percentages that correspond to these values.

In step S34, by using all of the plurality of facilities 300 as targets, the power management server 200 calculates the difference between the maximum demand power (<the previous demand power) in the demand response period and the previous demand power.

In step S35, the power management server 200 configures the first margin on the basis of the difference calculated in step S32. Here, the first margin is a negative value. For example, when the first margin is represented by a percentage by which the contracted power amount is multiplied, the first margin is given by the difference/the contracted power amount. Therefore, the margin threshold value is calculated by the contracted power amount×(1+the first margin). Thus, fewer facilities 300 than in the embodiment are selected as first facilities.

Here, the first margin may be a value obtained by subtracting the previous demand power from the maximum demand power or may be a value obtained by multiplying the value obtained by subtracting the previous demand power from the maximum demand power by a coefficient. The first margin may also be represented by percentages that correspond to these values.

Although FIG. 11 illustrates a case where the first margin is added to the contracted power amount when the shortage time period is not included in the demand response period, the first margin need not be added to the contracted power amount in such a case. That is, steps S34 and S35 may be omitted.

(Action and Effect)

In modification example 1, the power management server 200 selects, as first facilities (that is, a candidate of the first facility and the second facility), the facilities 300 until the secured power amount exceeds a margin threshold value obtained by adding the first margin to the contracted power amount. Thus, the possibility of a shortage error or an excess error in the reduced power occurring can be further reduced.

Modification Example 2

A modification example 2 of the embodiment will be described hereinbelow. Differences from the embodiment will primarily be described hereinbelow.

In modification example 2, adjustment processing in the feedback processing of the second processing outlined in the embodiment will be described in detail. As mentioned earlier, the adjustment processing is processing that, during an Nth unit time period, compensates for a shortage error or an excess error in the reduced power in an N−Xth unit time period.

Figure 12:
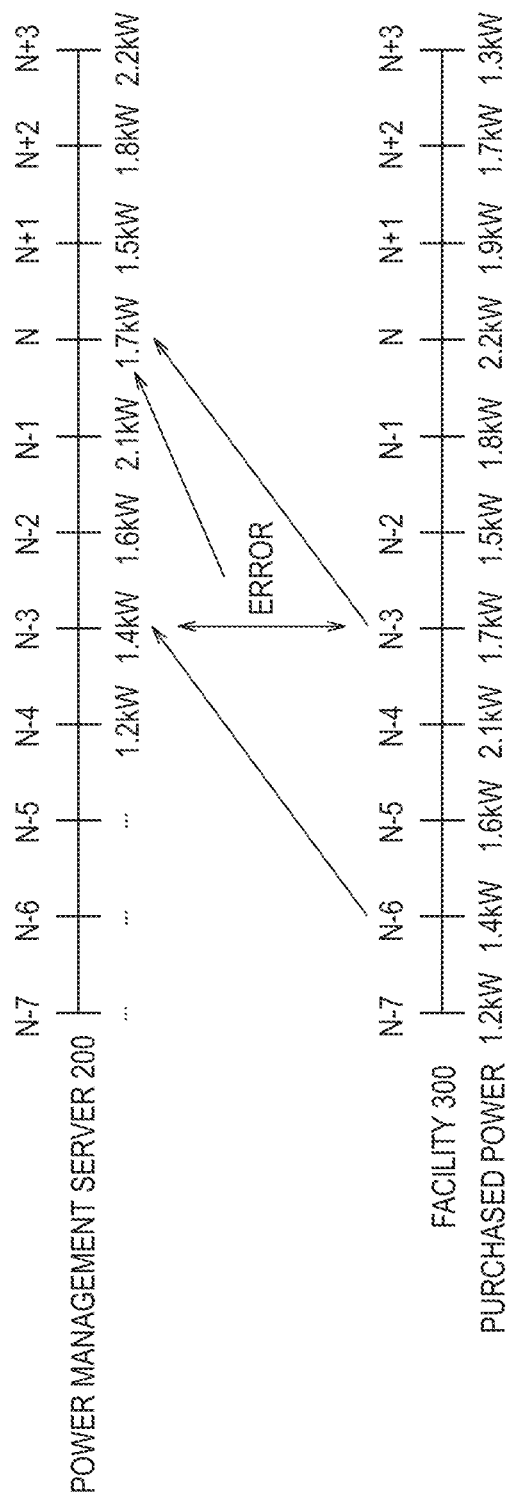
FIG. 12 is a diagram to illustrate a modification example 2.

As illustrated in FIG. 12, the purchased power (feedback purchased power) transmitted from the facilities 300 to the power management server 200 involves X (here, three unit time periods) delay time periods. Therefore, the feedback purchased power (1.4 kW), which is referred to in an N−3th unit time period, is the purchased power (1.4 kW) of the facilities 300 in an N−6th unit time period. Hence, a error (−0.3 kW=1.4 kW-1.7 kW) that accompanies the delay time period occurs in the N−3th unit time period.

In modification example 2, by taking this error that accompanies the delay time period into account, the power management server 200 (the controller 230) controls, in the Nth unit time period, the storage battery apparatus 320 on the basis of a margin difference that is obtained by adding a second margin to the difference between the purchased power in the N−3th unit time period and the second target value. The second margin may have either a positive value or a negative value. The second margin may be represented by power that is added to the difference between the purchased power and the second target value or may be represented by a percentage by which the difference between the purchased power and the second target value is multiplied.

For example, the power management server 200 may configure the second margin on the basis of a error between the purchased power in the N−3th unit time period and the purchased power in the N−6th unit time period (−0.3 kW here). In such a case, the second margin may be configured individually for each facility 300 and may be configured in each unit time period. The second margin may be represented by the power added to the difference between the purchased power and the second target value. That is, when, conversely, a case where the second target value is 1 kW is assumed, the target value of the reduced power is 0.4 kW (1.7 kW−1 kW−0.3 kW).

Alternatively, the power management server 200 may configure the second margin on the basis of an estimated delay error. The estimated delay error may also be estimated on the basis of a historical delay error (for example, an average value for the delay error, a maximum value for the delay error, a minimum value for the delay error, or the like). For example, the historical delay error is the delay error measured using the same conditions (the time period, day of the week, month, for example) as the demand response period. In such a case, the second margin may be configured individually for each facility 300 or may be configured as one value which is commonly used by all of the plurality of facilities 300. The second margin may also be configured as one value which is commonly used throughout the whole demand response period. The second margin may also be represented by a percentage by which the difference between the purchased power and the second target value is multiplied.

Modification Example 3

A modification example 3 of the embodiment will be described hereinbelow. Differences from the embodiment will primarily be described hereinbelow.

In the embodiment, as illustrated in FIG. 10, the power management server 200 selects, as first facilities, the facilities 300 in ascending order of demand power until the secured power amount exceeds the contracted power amount, and replaces some of the selected first facilities with second facilities. In contrast, in modification example 3, the power management server 200 predetermines whether to apply the first processing (load following processing) or to apply the second processing (sequential processing) to each of the plurality of facilities 300. Next, the power management server 200 selects the facilities 300 up to the point where the secured power amount exceeds the contracted power amount.

For example, in a case where a demand response is triggered, the power management server 200 reduces the demand power by means of the following procedure.

First, the power management server 200 decides to apply the second processing (sequential processing) to facilities 300 for which the previous demand power is greater than a predetermined threshold value and decides to apply the first processing (load following processing) to facilities 300 for which the previous demand power is equal to or below the predetermined threshold value.

Second, the power management server 200 selects the facilities 300 in descending order of priority ranking up to the point where the secured power amount exceeds the contracted power amount. For example, the priority ranking may increase as the previous demand power drops.

In modification example 3, the secured power amount may be the total of the power amounts that can be reduced from the baseline power (demand power) for the facilities 300 selected as first facilities and second facilities. The reducible power amount may be a value obtained by combining the total of the values obtained by subtracting the first target value from the baseline power of the first facilities with the total of the values obtained by subtracting the second target value from the baseline power of the second facilities.

Modification Example 4

A modification example 4 of the embodiment will be described hereinbelow. Differences from the embodiment will primarily be described hereinbelow.

A method for determining the foregoing first margin will be described in modification example 4. The first margin is a value that defines a margin threshold value by being added to the contracted power amount.

More specifically, in modification example 4, a case is assumed where the number of facilities 300 participating in a request to reduce the demand for power from the power grid 110 may vary. The facilities 300 participating in the reduction request are facilities 300 which are selected as first facilities or second facilities. Assuming such a case, the power management server 200 stores the number of facilities 300 participating in the reduction request in association with the first margin.

For example, as illustrated in FIG. 13, the power management server 200 stores the table illustrated in FIG. 13. Time Stamp is information indicating a time at which a reduction request is executed. Margin is information (a ratio here) indicating the first margin used in the reduction request. Count is the number of facilities 300 participating in the reduction request. Here, only records which are used in control such that a shortage error or excess error in the reduced power is equal to or below a predetermined error may be stored in the table illustrated in FIG. 13.

In such a case, the power management server 200 uses, as the first margin, the Margin which is associated with the Count closest to the number of facilities 300 participating in the current reduction request. For example, when the number of facilities 300 participating in the current reduction request is 65, the Margin associated with a Count of 63, that is, "0.46", which was used in the reduction request on 2018 Jul. 5, is used as the first margin.

Furthermore, when the number of facilities 300 participating in the current reduction request is 52, the Margin associated with a Count of 50, that is, "1.00", which was used in the reduction request on 2018 Jul. 2, or "0.87" in the reduction request on 2018 Jul. 3, is used as the first margin. Thus, when the Count closest to the number of facilities 300 participating in the current reduction request is 2 or more, the Margin associated with the Count which is temporally close to the current reduction request, that is, "0.87" in the reduction request on 2018 Jul. 3, may be used as the first margin. Alternatively, a small Margin among the Margins associated with Counts of 2 or more, that is, "0.87" in the reduction request on 2018 Jul. 3, may be used as the first margin. Alternatively, the average value of the Margins associated with Counts of 2 or more, that is, approximately 0.94=(1.00+0.87)/2 may be used as the first margin.

In addition, the power management server 200 may correct the Margin associated with the closest Count in a case where the difference between the number of facilities 300 participating in the current reduction request (the target number hereinbelow) and the Count (the reference number hereinbelow) closest to the facilities 300 participating in the current reduction request is greater than a predetermined number. The Margin is corrected such that the Margin is then small on the basis of the ratio between the target number and the reference number. The Margin may be corrected according to the formula Margin=Margin×|1−(reference number/target number)|. For example, when the number of facilities 300 participating in the current reduction request is 100, the Count closest to 100 is 63, but "0.46", which is associated with 63, is corrected. According to the foregoing formula, 0.17=0.46×|1−(63/100)| is used as the first margin.

Modification Example 5

A modification example 5 of the embodiment will be described hereinbelow. Differences from the embodiment will primarily be described hereinbelow.

A method for configuring purchased power target values will be described in modification example 5. Purchased power target values may include a first target value which is used in the first processing and may include a second target value which is used in the second processing.

More specifically, in modification example 5, a case is assumed where the facilities 300 managed by the power management server 200 include target facilities which are selected as first facilities or second facilities and nontarget facilities which are not selected as either first facilities or second facilities. Nontarget facilities may also include facilities 300 excluded in the foregoing step S20. Nontarget facilities may also include facilities 300 not participating in the request to reduce the demand for power from the power grid 110. Assuming such a case, the power management server 200 configures purchased power target values which are used by the target facilities, on the basis of the difference between the baseline power of the nontarget facilities and the demand power of the nontarget facilities. In other words, the power management server 200 compensates for the difference between the baseline power of the nontarget facilities and the estimated demand power of the nontarget facilities by controlling the target facilities.

Figure 14:
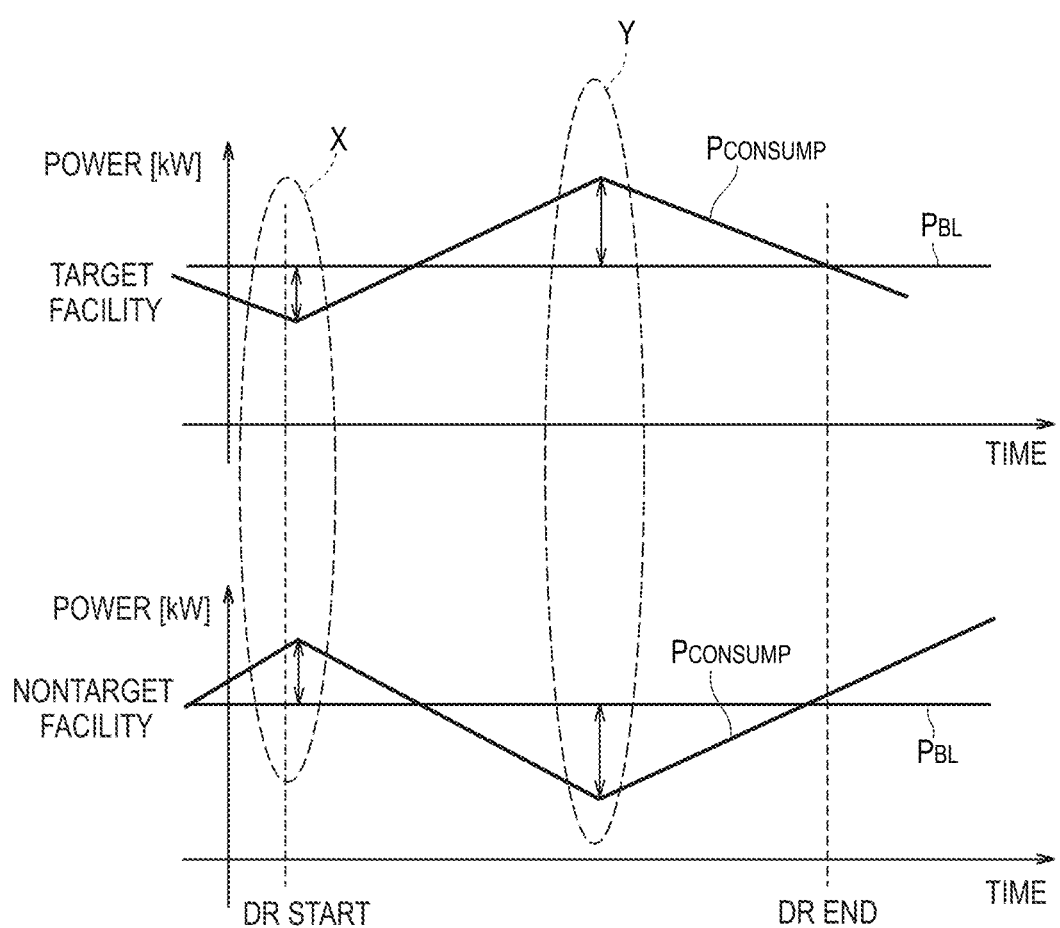
FIG. 14 is a diagram to illustrate a modification example 5.

For example, as illustrated in FIG. 14, the demand power ($P_{CONSUMP}$) of the nontarget facilities in time period X is greater than the baseline power ($P_{BL}$) of the nontarget facilities. In such a case, the power management server 200 reduces the target values used by the target facilities so that the demand power ($P_{CONSUMP}$) of the target facilities is less than the baseline power ($P_{BL}$) of the target facilities. Thus, an excess in the demand power ($P_{CONSUMP}$) of the nontarget facilities is compensated for.

However, the demand power ($P_{CONSUMP}$) of the nontarget facilities in time period Y is less than the baseline power ($P_{BL}$) of the nontarget facilities. In such a case, the power management server 200 increases the target values used by the target facilities so that the demand power ($P_{CONSUMP}$) of the target facilities is greater than the baseline power ($P_{BL}$) of the target facilities. Thus, a shortage in the demand power ($P_{CONSUMP}$) of the nontarget facilities is compensated for.

Modification Example 6

A modification example 6 of the embodiment will be described hereinbelow. Differences from the embodiment will primarily be described hereinbelow. A method for selecting target facilities and nontarget facilities will be described in modification example 6.

First, the power management server 200 may classify the target facilities as first target facilities and second target facilities. First target facilities are facilities that compensate for an excess or a shortage in the demand power of the nontarget facilities. Second target facilities are facilities that do not compensate for an excess or a shortage in the demand power of the nontarget facilities.

For example, when an excess in the demand power of the nontarget facilities is estimated, the power management server 200 selects, as first target facilities, facilities 300 for which the estimated demand power is estimated to be less than the baseline power. When a shortage in the demand power of the nontarget facilities is estimated, the power management server 200 selects, as first target facilities, facilities 300 for which the estimated demand power is estimated to be greater than the baseline power. In such cases, the power management server 200 may select, as second facilities, facilities 300 for which the difference between the estimated demand power and the baseline power is equal to or below a threshold value.

For example, when it is estimated that an excess or shortage in the demand power of the nontarget facilities will not occur, the power management server 200 may select, as first target facilities, facilities 300 for which the difference between the estimated demand power and the baseline power is equal to or below the threshold value. In such a case, the power management server 200 may select, as second target facilities, facilities 300 for which the difference between the estimated demand power and the baseline power is greater than the threshold value.

By classifying the target facilities as first target facilities and second target facilities as described hereinabove, it is possible to suppress the number of first target facilities controlled by compensating for an excess or shortage in the demand power of the nontarget facilities and it is possible to simplify the control involved in the compensation.

Second, the power management server 200 may classify the nontarget facilities as first nontarget facilities and second nontarget facilities. First nontarget facilities are facilities for which there is a need to compensate for an excess or shortage in demand power by means of the target facilities. Second nontarget facilities are facilities for which there is no need to compensate for an excess or shortage in demand power by means of the target facilities.

For example, the power management server 200 selects, as first nontarget facilities, facilities 300 for which the difference between the estimated demand power and the baseline power is greater than a threshold value. On the other hand, the power management server 200 selects, as second nontarget facilities, facilities 300 for which the difference between the estimated demand power and the baseline power is equal to or below the threshold value. In such a case, when a shortage in the demand power of the first nontarget facilities is estimated, the demand power of the target facilities can be increased, and the reduced power of the target facilities can be suppressed.

By classifying the nontarget facilities as first nontarget facilities and second nontarget facilities as described hereinabove, it is possible to suppress the number of facilities for which an excess or shortage in demand power should be compensated, and it is possible to reduce the burden on the target facilities involved in the compensation. In addition, by utilizing compensation of an excess or a shortage in the demand power of the first nontarget facilities, there is then room for suppressing the reduced power of the target facilities.

Third, the power management server 200 may preferentially select, as target facilities, facilities 300 for which the difference between the historical demand power and the historical baseline power is greater than a threshold value. In other words, the power management server 200 may preferentially select, as nontarget facilities, facilities 300 for which the error between the historical demand power and the historical baseline power is less than a predetermined error.

According to such a configuration, because facilities 300 for which the error between the historical demand power and the historical baseline power is large are not selected as nontarget facilities, it is possible to suppress an increase in the load of the control involved in the compensation of an excess or a shortage in the demand power of the nontarget facilities.

Fourth, the power management server 200 may select target facilities so that the percentage of the nontarget facilities relative to all the facilities 300 is equal to or below a fixed percentage. Alternatively, the power management server 200 may select target facilities so that the percentage of the nontarget facilities relative to the target facilities is equal to or below a fixed percentage. Alternatively, the power management server 200 may select target facilities so that the percentage of the target facilities relative to the nontarget facilities is equal to or greater than a fixed percentage.

According to such a configuration, an increase in the error between the demand power of the nontarget facilities and the baseline power of the nontarget facilities is suppressed, and it is possible to suppress an increase in the load of the control involved in the compensation of an excess or a shortage in the demand power of the nontarget facilities.

Fifth, the power management server 200 may determine the number of target facilities so that the total of the errors between the estimated demand power of the nontarget facilities and the baseline power of the nontarget facilities is equal to or below a predetermined error.

According to such a configuration, an increase in the error between the demand power of the nontarget facilities and the baseline power of the nontarget facilities is suppressed, and it is possible to suppress an increase in the load of the control involved in the compensation of an excess or a shortage in the demand power of the nontarget facilities.

Further Embodiments

The present invention was described by means of the foregoing embodiment but the description and the drawings of the parts in this disclosure should not be understood as limiting the invention. Based on this disclosure, a variety of alternative embodiments, embodiment examples, and production techniques are obvious to a person skilled in the art.

In the embodiment, the solar cell apparatus 310 and the fuel cell apparatus 330 are provided. However, the embodiment is not limited to or by such an arrangement. The storage battery apparatus 320 may also be provided as the distributed power supply instead of providing the solar cell apparatus 310 and the fuel cell apparatus 330.

In the embodiment, the storage battery apparatus 320 is illustrated as a distributed power supply to which the first processing or the second processing is applied. However, the embodiment is not limited to or by such an arrangement. The distributed power supply to which the first processing or the second processing is applied may also be the fuel cell apparatus 330. In such a case, the fuel cell apparatus 330 may perform load following processing after correcting the demand power by means of a target value (the first target value or the second target value).

In this embodiment, a case where the second processing is processing in which the storage battery apparatus 320 is remotely controlled by the power management server 200 is illustrated. However, the embodiment is not limited to or by such an arrangement. The second processing may also be processing which the storage battery apparatus 320 or the local control apparatus 360 executes autonomously. In such a case, the storage battery apparatus 320 or the local control apparatus 360 controls the output of the storage battery apparatus 320 by using the second target value notified by the power management server 200. The power management server 200 may notify the storage battery apparatus 320 or the local control apparatus 360 of the second target value before the demand response period starts or during the demand response period, in response to the demand response being triggered. The storage battery apparatus 320 or the local control apparatus 360 may perform the feedback processing illustrated in FIG. 7.

In the embodiment, a case in which a shortage and an excess of the reduced power is absorbed by each of the facilities 300 in the feedback processing of the second processing is illustrated. However, the embodiment is not limited to or by such an arrangement. When a shortage and an excess of the reduced power cannot be absorbed by one facility 300, the second processing may be executed so as to absorb a shortage and an excess of the reduced power of all the facilities 300 selected as second facilities.

In the embodiment, a case is illustrated where processing to select first facilities and second facilities is performed before the demand response period is started. However, the embodiment is not limited to or by such an arrangement. The processing to select first facilities and second facilities may be performed by taking the demand response period as a target. Hence, processing to select the first facilities and second facilities may be performed in the demand response period. In such a case, the processing to select first facilities and second facilities may be performed on the basis of an absolute amount or a variation amount of the real-time demand power in the demand response period. Furthermore, a shortage amount and an excess amount of the reduced power in the demand response period are calculated, and the processing to select first facilities and second facilities may be performed on the basis of the shortage amount and the excess amount thus calculated.

Although the baseline power and the previous demand power are used for different purposes in the embodiment, the previous demand power may be replaced with the baseline power or the baseline power may be replaced with the previous demand power.

Although there is no particular mention in the embodiment, the storage battery apparatus 320 may be a storage battery apparatus that is securely connected to a power line provided in the facilities 300 or may be a storage battery apparatus that is detachably connected to a power line provided in the facilities 300. As a storage battery apparatus that is detachably connected to a power line provided in the facilities 300, a storage battery apparatus provided in an electric vehicle may be considered.

Although there is no particular mention in the embodiment, the local control apparatus 360 provided in the facilities 300 need not necessarily be provided inside the facilities 300. For example, some of the functions of the local control apparatus 360 may also be provided by a cloud server provided on the internet. In other words, the local control apparatus 360 may also be considered as including a cloud server.

In the embodiment, a case is illustrated where the first protocol is a protocol that conforms to Open ADR 2.0 and the second protocol is a protocol that conforms to ECHONET Lite. However, the embodiment is not limited to or by such an arrangement. The first protocol may be a protocol that is standardized as a protocol which is used in communication between the power management server 200 and the local control apparatus 360. The second protocol may be a protocol that is standardized as a protocol which is used in the facilities 300.

Note that the entire contents of Japanese Patent Application No. 2017-228874 (filed on Nov. 29, 2017) and Japanese Patent Application No. 2018-077153 (filed on Apr. 12, 2018) are incorporated by reference in the present specification.

The invention claimed is:

1. A power management server, comprising:
   a controller configured to select based on a predetermined standard, from among a plurality of facilities including a distributed power supply, a first facility in which first processing is applied to the distributed power supply and a second facility in which second processing is applied to the distributed power supply,
   wherein the first processing is processing of controlling an output power of the distributed power supply by using a first target value as a target value for purchased power purchased by the facility from a power provider, the second processing is processing of controlling the output power of the distributed power supply by using a second target value as the target value for the purchased power, the second target value being greater than the first target value, the controller is configured to select a candidate of the first facility and the second facility until a secured power amount exceeds a margin threshold value which is obtained by adding a first margin to a contracted power amount, the contracted power amount is a power amount which is established to be reduced from a baseline power as all of the plurality of facilities, the secured power amount is a total power amount which can be reduced from the baseline power of facilities selected as the candidate of the first facility and the second facility, and the controller is configured to configure the first margin based on an estimated demand power of the plurality of facilities.

2. The power management server according to claim 1, wherein the controller is configured to select the first facility and the second facility by taking, as a target, a demand response period during which there is a shortage of power in a power grid.

3. The power management server according to claim 1, wherein the first target value is zero.

4. The power management server according to claim 1, wherein the first processing includes processing which the distributed power supply executes autonomously, and the second processing includes feedback processing of controlling the distributed power supply based on a difference between the second target value and the purchased power.

5. The power management server according to claim 4, wherein the second processing includes processing of remotely controlling the distributed power supply by the controller.

6. The power management server according to claim 4, wherein the controller is configured to configure the first target value and the second target value based on at least one of a reduced power toward the baseline power, a reduced power toward the baseline power and an absolute value of the purchased power, and the baseline power is established based on a power supplied to a facility from the power provider.

7. The power management server according to claim 1, wherein the predetermined standard is established to minimize an excess error and a shortage error in a reduced power of all power supplied to the plurality of facilities from the power provider.

8. The power management server according to claim 7, wherein the predetermined standard is a standard based on at least one of an absolute amount of the demand power of a facility, a fluctuation amount of the demand power of a facility, degradation degree of the distributed power supply, a cost of a output power of the distributed power supply, a type of the distributed power supply, and a type of equipment provided in a facility.

9. The power management server according to claim 1, wherein the second processing includes feedback processing of controlling, in an Nth (N is a natural number) unit time period, the distributed power supply based on a margin difference which is obtained by adding a second margin to a difference between the second target value and the purchased power in an N–Xth (X is a natural number less than N) unit time period.

10. The power management server according to claim 9, wherein the controller is configured to configure the second margin based on an error between the purchased power in an N–2Xth unit time period and the purchased power in the N–Xth unit time period or configure the second margin based an estimated delay error.

11. A power management method, comprising:

selecting, based on a predetermined standard, from among a plurality of facilities including a distributed power supply, a first facility in which first processing is applied to the distributed power supply and a second facility in which second processing is applied to the distributed power supply; and configuring a first margin which is added to a contracted power amount based on an estimated demand power of the plurality of facilities, wherein the first processing is processing of controlling an output power of the distributed power supply by using a first target value as a target value for purchased power purchased by the facility from a power provider, the second processing is processing of controlling the output power of the distributed power supply by using a second target value as the target value for the purchased power, the second target value being greater than the first target value, the selecting the first facility and the second facility includes selecting a candidate of the first facility and the second facility until a secured power amount exceeds a margin threshold value which is obtained by adding the first margin to the contracted power amount, the contracted power amount is a power amount which is established to be reduced from a baseline power as all of the plurality of facilities, and the secured power amount is a total power amount which can be reduced from the baseline power of facilities selected as the candidate of the first facility and the second facility.

* * * * *